S. SANTILLI.
MACHINE FOR MAKING MACARONI AND NOODLES.
APPLICATION FILED JULY 22, 1920.

1,384,350.

Patented July 12, 1921.
2 SHEETS—SHEET 1.

INVENTOR
Stefano Santilli

S. SANTILLI.
MACHINE FOR MAKING MACARONI AND NOODLES.
APPLICATION FILED JULY 22, 1920.
1,384,350.
Patented July 12, 1921.
2 SHEETS—SHEET 2.
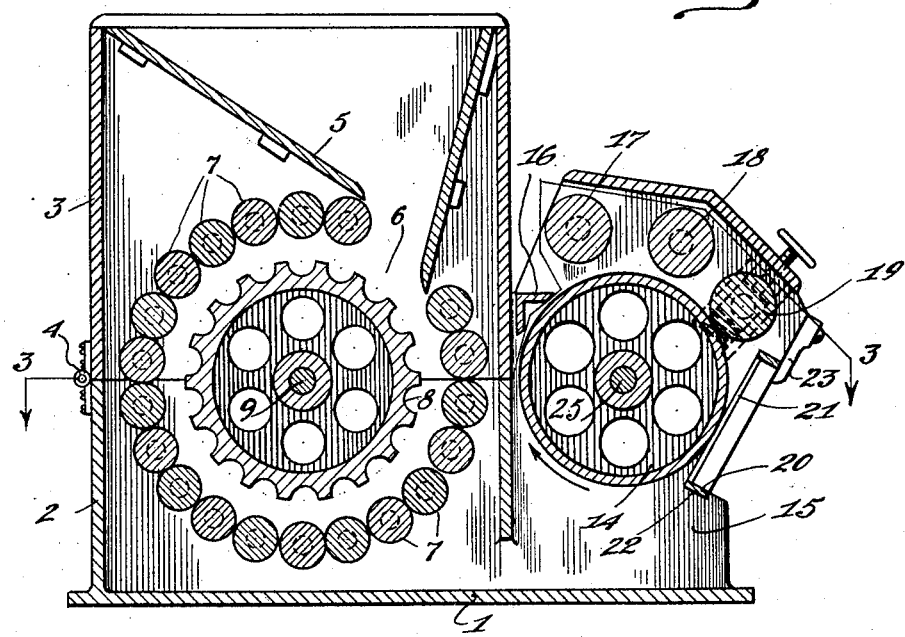
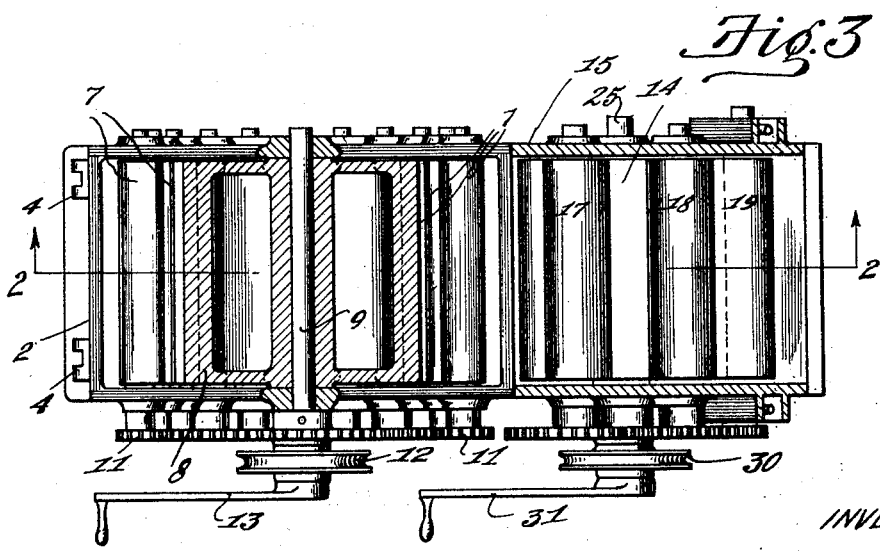
INVENTOR
Stefano Santilli

UNITED STATES PATENT OFFICE.

STEFANO SANTILLI, OF CANTON, OHIO.

MACHINE FOR MAKING MACARONI AND NOODLES.

1,384,350.

Specification of Letters Patent.  Patented July 12, 1921.

Application filed July 22, 1920. Serial No. 398,253.

*To all whom it may concern:*

Be it known that I, STEFANO SANTILLI, a subject of the King of Italy, residing at Canton, in the county of Stark and State of Ohio, have invented a new and useful Machine for Making Macaroni and Noodles, of which the following is a specification.

This invention relates to a machine for making macaroni and more particularly to a rotary dough kneader and means for rolling the dough into a sheet and cutting the sheet into strips.

The objects of the invention are the provision of a dough kneader comprising a revolving corrugated drum, said drum revolving within and being spaced from a concave of small rollers, said rollers being driven in a direction opposite to the drum, and the provision of means for rolling the kneaded dough into a sheet and passing said sheet through a screen formed of a plurality of wires located at right angles to the plane of the sheet of dough and arranged to cut the sheet into strips in suitable sizes for use as macaroni, noodles and the like.

With these objects in view the invention consists in the novel construction and arrangement of parts, hereinafter described, illustrated in the accompanying drawings, and particularly pointed out in the claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Fig. 2 is a section on the line 2—2, Fig. 3.

Fig. 3 is a section on the line 3—3, Fig. 2.

A practical embodiment of the invention is disclosed in the accompanying drawings, forming a part of this specification in which similar numerals of reference indicate corresponding parts throughout the several views.

Figure 1:
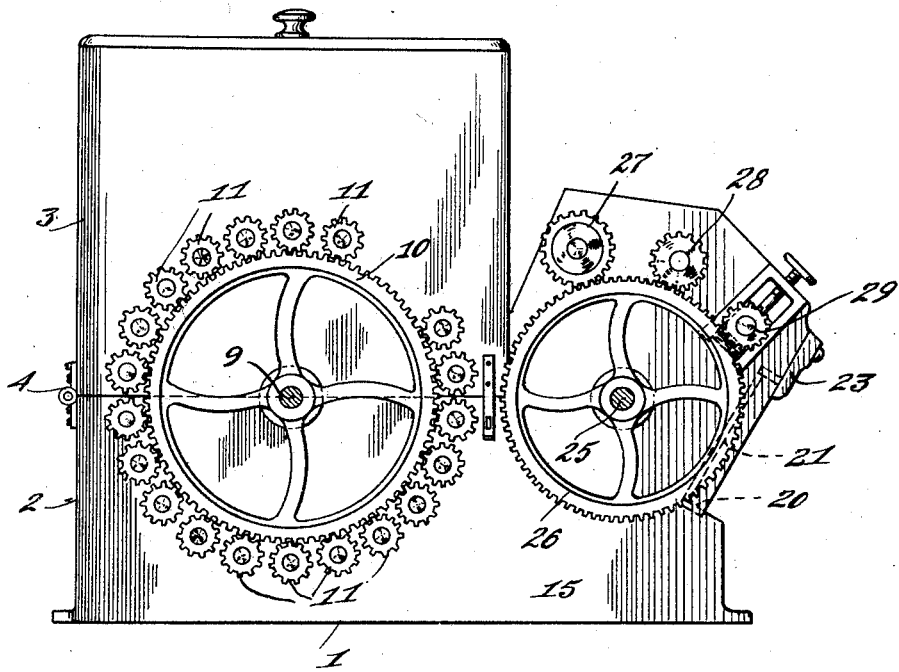
Figure 1 is a side elevation of a machine embodying the invention.
Figure 4:
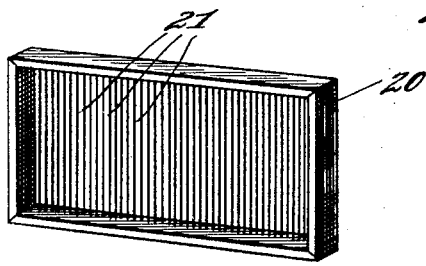
Fig. 4 is a perspective view of the wire screen through which the sheet of dough is passed.

The device is mounted upon the base 1, a box 2 being formed thereon and provided with the hinged upper portion 3 hingedly connected to the lower portion at 4, said hinged portion being provided with the hopper 5 which registers with the openings 6 in the concave formed of the plurality of small rollers 7, said rollers being so located that each engages the adjacent rollers.

A corrugated drum 8 is concentrically mounted within the concave thus formed, said drum being journaled between the box 2 and the hinged portion 3 at the plane of operation of said parts.

The shaft 9 of the drum 8 carries a large gear 10, which meshes with the pinions 11 formed upon the extremities of the rollers 7. A pulley 12 may be provided upon the shaft 9 for driving the same by power or a handle 13 may be provided thereon in order that the device may be hand operated if desired.

The large roller 14 is journaled at one side of the box 2 in suitable bearings formed in the side walls 15 and a small table 16 is carried between said side walls adjacent to the roller 14, said roller being arranged to rotate away from said table as shown by the arrow in Fig. 2.

A plurality of smaller rollers 17, 18 and 19 are located above the roller 14. The roller 17 is located adjacent to the table 6 and spaced from the periphery of the roller 14, the roller 18 is spaced from the roller 17 and is located considerably closer to the periphery of the roller 14 than the roller 17. The roller 19 is mounted in a flexible bearing and is located beyond the roller 18 and arranged to engage the periphery of the roller 14.

A screen is arranged beyond the roller 19 and adjacent to the roller 14, said screen comprising a frame 20 having a plurality of vertical wires 21 mounted therein, said wires being equi-distantly spaced from each other, the frame 20 is mounted in suitable sockets 22 formed in the side walls 15, a latch 23 being provided for holding the screen in position.

The shaft 25 of the roller 14 has mounted thereon a large gear 26 which meshes with the pinions 27, 28 and 29 mounted upon the extremities of the rollers 17, 18 and 19 respectively. For the purpose of applying power to the shaft 25, in order to drive the same, a pulley 30 is mounted upon said shaft and a crank 31 is also provided upon the shaft in order that the same may be rotated by hand.

The operation of the device is as follows: The dough is deposited in the hopper 5 and is drawn down through the opening 6 into the space between the drum 8 and the concave of rollers 7 by the rotation of the shaft 9. The corrugated drum 8 and the rollers 7 continually operating in opposite direction will cause the dough to be continually carried around within said concave, thus mixing and kneading the dough. When the dough has been properly mixed the hinge portion 3 of the box is swung back allowing the kneaded dough to be easily removed.

The kneaded dough is then placed upon the table 16 and the roller 14 is rotated in the direction of the arrow shown in Fig. 2 and through the gearing above described the rollers 17, 18 and 19 will be rotated in the opposite direction causing the dough to be drawn between the roller 14 and the rollers 17, 18 and 19 successively reducing the dough to a thin sheet and feeding it through the wires 21 in the screen causing the dough to issue therefrom in narrow strips which will then be dried in the usual manner and ready for use.

From the above it will be evident that a machine is produced which mixes and kneads the raw dough and through which the dough after being properly kneaded is rolled into a sheet and cut into strips of proper width for use as macaroni or noodles.

Although the drawings and above specification disclose the best mode in which I have contemplated embodying my invention, I desire to be not limited to the details of such disclosure, for, in the further practical application of my invention, many changes in form and construction may be made, as circumstances require or experience suggests without departing from the spirit of the invention, within the scope of the appended claims.

I claim:

1. A device of the character described comprising a large roll, a plurality of smaller rolls located around a portion of the periphery thereof, means for rotating the large roll in one direction, means for rotating the smaller rolls in the opposite direction to produce a flat sheet of dough, and a screen comprising a plurality of wires coöperating with said large roll to cut the sheet of dough into ribbons.

2. A device of the character described, comprising a large roll, a plurality of smaller rolls located around a portion of the periphery thereof, each successive small roll being located closer to the large roll than the last preceding small roll, means for rotating the large roll in one direction, means for rotating the smaller rolls in the opposite direction to produce a flat sheet of dough and a screen comprising a plurality of wires coöperating with said large roll to cut the sheet of dough into ribbons.

3. In a machine for making macaroni or noodles, a large roll, a table adjacent to said roll arranged to receive a mass of dough, a plurality of smaller rolls located around a portion of the periphery of the large roll, the small roll nearest to said table being spaced from the large roll, each succeeding small roll being located nearer to the large roll than the next preceding small roll, a screen comprising a plurality of spaced wires located against and coöperating with the large roll upon the opposite side thereof to said table and means for rotating all of said rolls in a direction to carry dough from the table between the large roll and the small rolls to form said dough into a thin sheet and through said screen to cut the sheet into ribbons.

4. In a machine for making macaroni or noodles, a large roll, a plurality of small rolls located around a portion of the periphery thereof, each successive small roll being located closer to the large roll than the last preceding roll, means for rotating all of said rolls in a direction to roll a mass of dough into a thin sheet and means coöperating with the large roll through which the sheet of dough is passed to cut the same into ribbons.

In testimony that I claim the above, I have hereunto subscribed my name.

STEFANO SANTILLI.